(12) United States Patent
Suttie et al.

(10) Patent No.: US 7,516,621 B2
(45) Date of Patent: Apr. 14, 2009

(54) MODULAR LRU ACCESSORY MOUNTING SUBSTRATE FOR AUXILIARY POWER UNIT

(75) Inventors: Peter J. Suttie, San Diego, CA (US);
Gordon F. Jewess, San Diego, CA (US);
Khang D. Ta, San Diego, CA (US);
Michael J. Olderbak, Rockford, IL (US); Thomas H. Diot, San Diego, CA (US); Edward R. McQuillan, San Diego, CA (US); Daniel M. Gregory, Santee, CA (US); Stephen Worthington, New Hartford, CT (US); Rusty E. Mayborne, Roscoe, IL (US); Michael D. Kohls, Loves Park, IL (US); Daniel L. Hughes, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 352 days.

(21) Appl. No.: 11/197,389

(22) Filed: Aug. 4, 2005

(65) Prior Publication Data

US 2007/0029454 A1 Feb. 8, 2007

(51) Int. Cl.
*F02C 7/32* (2006.01)
(52) U.S. Cl. .............................. 60/796; 60/802; 248/639
(58) Field of Classification Search .................. 60/796, 60/798, 802; 248/558, 638, 639
See application file for complete search history.

(56) References Cited

U.S. PATENT DOCUMENTS

| | | | | | |
|---|---|---|---|---|---|
| 2,432,358 | A | * | 12/1947 | Warner | 60/802 |
| 2,548,858 | A | * | 4/1951 | Benrdict | 415/122.1 |
| 2,618,119 | A | * | 11/1952 | Redding et al. | 60/802 |
| 3,710,568 | A | * | 1/1973 | Rice | 60/796 |
| 5,174,109 | A | * | 12/1992 | Lampe | 60/788 |
| 5,249,417 | A | * | 10/1993 | Duesler et al. | 60/772 |

\* cited by examiner

*Primary Examiner*—Louis J Casaregola
(74) *Attorney, Agent, or Firm*—Stephen G. Mican

(57) ABSTRACT

A multiple accessory support bracket that mounts a plurality of external accessories for an auxiliary power unit (APU) so that all the external accessories may be mounted to the APU in a single operation.

26 Claims, 2 Drawing Sheets

MODULAR LRU ACCESSORY MOUNTING SUBSTRATE FOR AUXILIARY POWER UNIT

FIELD OF THE INVENTION

The invention relates to the assembly of a gas turbine engine such as an auxiliary power unit (APU), and more particularly a modularised system of assembling accessories onto an APU.

BACKGROUND OF THE INVENTION

Current APU designs for both commercial and military aeronautical applications have individually mounted external accessory components, such as line replaceable units (LRUs), tubes and electrical harnesses, as well as associated mounting brackets, clamps, isolators and bolts. The assembly of so many components onto the surfaces of the APU is a complex and time-consuming process. The number of assembly steps increases the likelihood of quality problems. Furthermore, the procurement and stocking of such a multitude of individual parts increases stored inventory and therefore increases the cost of the manufactured APU.

SUMMARY OF THE INVENTION

The invention comprises a special multiple accessory support bracket that serves to support and mount many or all of the external accessory components, such as LRUs, tubes and electrical harnesses that connect to the APU to facilitate installation of the components onto the accessory support bracket before installation of the accessory support bracket on the APU. The multiple accessory support bracket preferably has its own vibration isolators that serve to provide all components that are mounted to it. Since all the external accessories then install on to the APU as a single pre-assembled unit, this configuration reduces the number of parts needed for assembly, thereby reducing inventory and cost. A mounting tool may be used to conveniently attach and remove the multiple accessory support bracket with all associated components mounted to it, thereby further reducing assembly time and cost.

In the preferred embodiment, the invention comprises a multiple accessory support bracket that supports a plurality of accessories for an APU, comprising: an accessory mounting surface that form-fits a mating surface on the APU; a plurality of primary bracket attachment points on the multiple accessory support bracket for attaching the multiple accessory support bracket to the mating surface on the APU; and a plurality of secondary bracket attachment points along the accessory mounting surface for mounting the accessories on the accessory support bracket.

DETAILED DESCRIPTION OF THE INVENTION

Figure 1:
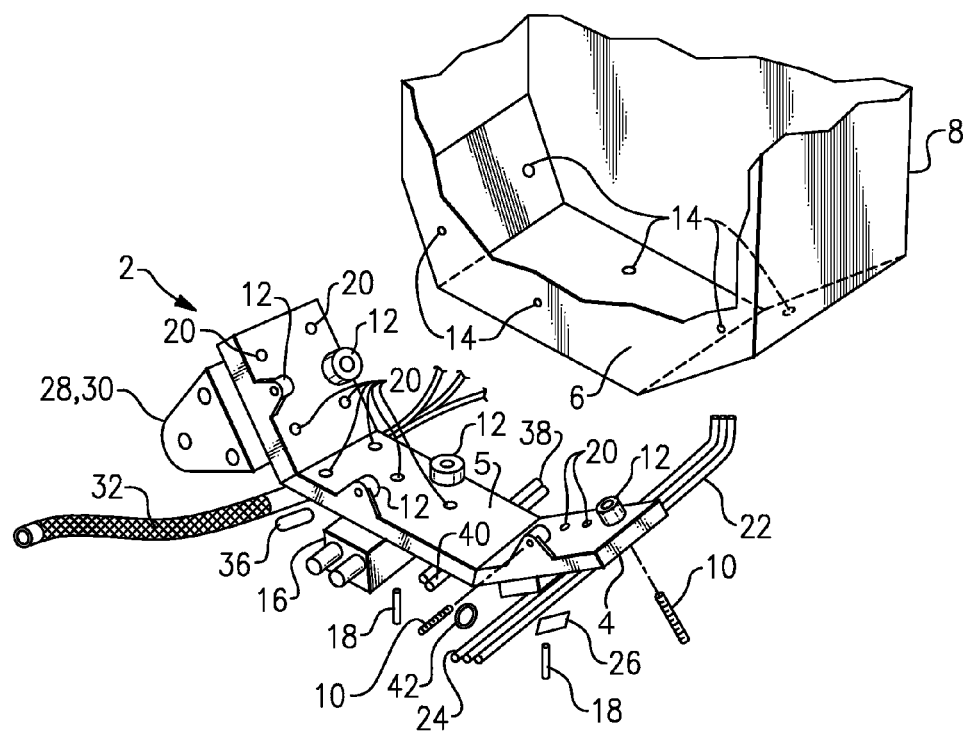
FIG. 1 is a perspective view of an APU multiple accessory support bracket according to a preferred embodiment of the invention.

FIG. 1 is a perspective view of an APU multiple accessory support bracket or "super Bracket" 2 according to one possible embodiment of the invention. The super bracket 2 preferably has a mounting surface 4 for mounting APU accessories and an attachment surface 5 on a side of the super bracket 2 generally opposite from the mounting surface 4 with a shape and contour that lets the super bracket 2 form-fit snugly to a mating surface 6 of an APU 8 to which it attaches. The super bracket 2 preferably attaches to the APU mating surface 6 by way of primary fasteners 10 that pass through primary bracket attachment points 12 on the super bracket 2 and fasten to APU attachment points 14 on the APU mating surface 6. The fasteners 10 preferably comprise attachment bolts and the APU attachment points 14 preferably comprise mating threaded holes for the primary fasteners 10, although other attachment methods could be used. The primary bracket attachment points 12 preferably comprise vibration isolators that conveniently provide vibration isolation for all components mounted to the super bracket 2.

The super bracket 2 permits various externally mounted APU accessories to be pre-assembled to it so that mounting of the super bracket 2 to the APU 8 mounts all of external accessories that are pre-assembled to it to be mounted to the APU in one operation. Examples of such external APU accessories that may be mounted to the super bracket 2 are LRUs, electrical wiring harnesses, fuel tube assemblies and pneumatic tube assemblies.

One type of LRU that commonly mounts to the APU 8 is a fuel control unit (FCU). A FCU 16 mounts to the mounting surface 4 of the super bracket 2 by way of secondary fasteners 18 that fasten the FCU 16 to secondary bracket attachment points 20 in the mounting surface 4. The secondary fasteners 18 preferably comprise attachment bolts and the secondary bracket attachment points 20 preferably comprise mating threaded holes for the secondary fasteners 18, although other attachment methods could be used. Various fuel tubes for distributing fuel to the APU 8 also attach to the APU 8. A fuel tube assembly 22 that comprises at least one fuel tube 24 attaches to the mounting surface 4 of the super bracket 2 by way of secondary fasteners 18 that pass through a fuel tube assembly clamp 26 and fasten to secondary bracket attachment points 22 in the mounting surface 4. Some fuel tubes 24 typically connect to the FCU 16.

Other types of LRUs that commonly mount to the APU are an exciter and a data memory module (DMM). An exciter 28 and DMM 30 also mount to the mounting surface 4 of the super bracket 2 by way of secondary fasteners 18 that fasten the exciter 28 and DMM 30 to secondary bracket attachment points 20 in the mounting surface 4. Various electrical wires for APU power and data connections also attach to the APU 8. An electrical wiring harness 32 that comprises at least one electrical wire 34 attaches to the mounting surface 4 of the super bracket 2 by way of secondary fasteners 18 that pass through a wiring harness clamp 36 and fasten to secondary bracket attachment points 20 in the mounting surface 4. Some of electrical wires 34 typically connect to the exciter 28 and DMM 30 to provide power and data connections for them.

The APU 8 generally provides pneumatic power as well as electric power by way of bleed air from an engine compressor or compressed air from an integral pneumatic load compressor within the APU 8. The compressed air may also be used for air conditioning purposes. A pneumatic tubing assembly 38 that comprises at least one pneumatic tube 40 attaches to the mounting surface 4 of the super bracket 2 by way of secondary fasteners 18 that pass through a pneumatic tube assembly clamp 42 and fasten to secondary bracket attachment points 20 in the mounting surface 4. Pneumatic tubes 40 may connect to the engine or load compressor of the APU 8 to couple compressed air for pneumatic power and air conditioning purposes within the aircraft.

Figure 2:
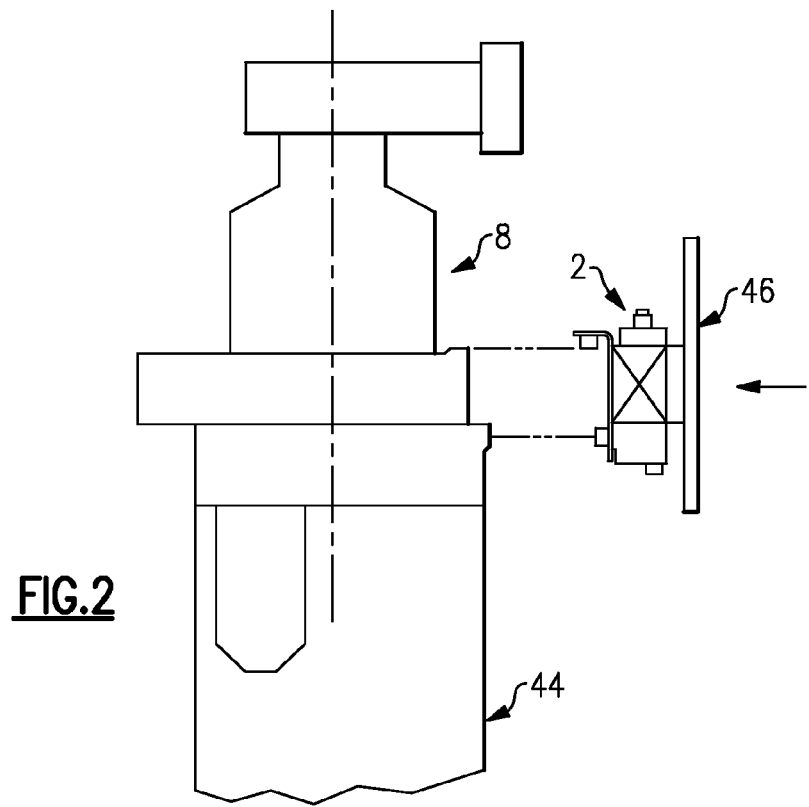
FIG. 2 is a side view of an APU multiple accessory support bracket according to a preferred embodiment of the invention placed in an APU accessory support bracket installation tool ready for attachment to an APU sitting in a vertical build jig.

FIG. 2 is a side view of the APU 8 sitting in a vertical build jig 44 and the super bracket 2 with all accessories as described above pre-mounted to it held in position by an super bracket installation tool 46. The super bracket installation tool 46 holds the super bracket 2 in proper position, for example with respect to height and angle orientation, relative to the APU 8 so that the super bracket 2 may be rapidly attached to the APU 8 as described above.

Figure 3:
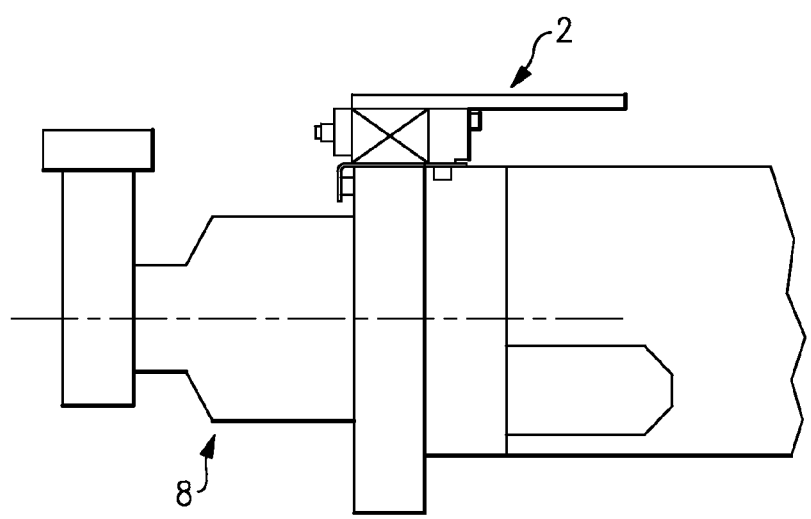
FIG. 3 is a perspective view of the APU multiple accessory support bracket according to a preferred embodiment of the invention attached to the APU.

FIG. 3 is a perspective view of the APU 8 with the super bracket 2 attached to it as described above. After attachment of the super bracket 2 to the APU 8, fuel tubes 24, electrical wires 34 and pneumatic tubes 40 pre-assembled to the super bracket 2 may be connected to the APU 8 as required.

Described above is a multiple accessory support bracket that mounts a plurality of external accessories for an auxiliary power unit (APU) so that all the external accessories may be mounted to the APU in a single operation. It should be understood that this embodiment is only an illustrative implementation of the invention, that the various parts and arrangement thereof may be changed or substituted, and that the invention is only limited by the scope of the attached claims.

What is claimed is:

1. A passive gearless multiple accessory support bracket that supports a plurality of external accessories for a gas turbine engine, comprising:
    an attachment surface with a shape and contour that form-fits with a mating surface on the engine;
    a plurality of primary bracket attachment points on the accessory support bracket for attaching the accessory support bracket to the mating surface on the engine;
    an accessory mounting surface on a side of the accessory support bracket generally opposite the attachment surface; and
    a plurality of secondary bracket attachment points along the accessory mounting surface for mounting the accessories on the multiple accessory support bracket.

2. The multiple accessory support bracket of claim 1, wherein the gas turbine engine is an auxiliary power unit (APU).

3. The multiple accessory support bracket of claim 1, wherein the primary bracket attachment points on the multiple accessory support bracket comprise a plurality of vibration isolators.

4. The multiple accessory support bracket of claim 1, wherein the primary fasteners pass through the primary bracket attachment points to fasten the multiple accessory support bracket to APU attachment points on the mating surface of the APU.

5. The multiple accessory support bracket of claim 1, wherein at least one of the secondary fasteners fasten to at least one of the secondary bracket attachment points to mount the accessories on the multiple accessory support bracket.

6. The multiple accessory support bracket of claim 1, wherein the accessories comprise at least one line replaceable unit (LRU).

7. The multiple accessory support bracket of claim 6, wherein the LRU comprises a fuel control unit (FCU).

8. The multiple accessory support bracket of claim 6, wherein the LRU comprises an exciter.

9. The multiple accessory support bracket of claim 6, wherein the LRU comprises a data memory module (DMM).

10. The multiple accessory support bracket of claim 1, wherein the accessories comprise at least one electrical wiring harness.

11. The multiple accessory support bracket of claim 10, wherein at least one of the secondary fasteners pass through an electrical wiring harness clamp and fasten to at least one of the secondary bracket attachment points to mount the electrical wiring harness on the multiple accessory support bracket.

12. The multiple accessory support bracket of claim 1, wherein the accessories comprise at least one fuel tube assembly.

13. The multiple accessory support bracket of claim 12, wherein at least one of the secondary fasteners pass through a fuel tube assembly clamp and fasten to at least one of the secondary bracket attachment points to mount the fuel tube assembly on the multiple accessory support bracket.

14. The multiple accessory support bracket of claim 1, wherein the accessories comprise at least one pneumatic tube assembly.

15. The multiple accessory support bracket of claim 14, wherein at least one of the secondary fasteners pass through a pneumatic tube assembly clamp and fasten to at least one of the secondary bracket attachment points to mount the pneumatic tube assembly on the multiple accessory support bracket.

16. A passive gearless multiple accessory support bracket that supports a plurality of external accessories for an auxiliary power unit (APU), comprising:
    an attachment surface with a shape and contour that form-fits with a mating surface on the APU;
    an accessory mounting surface on a side of the accessory support bracket generally opposite the attachment surface;
    a plurality of primary bracket attachment points on the multiple accessory support bracket that comprise vibration isolators for attaching the multiple accessory support bracket to the mating surface on the APU;
    a plurality of primary fasteners that pass through the primary bracket attachment points to fasten the accessory mounting bracket to APU attachment points on the mating surface of the APU;
    a plurality of secondary bracket attachment points along the accessory mounting surface for mounting the accessories on the multiple accessory support bracket; and
    a plurality of secondary fasteners that fasten the accessories to the secondary bracket attachment points to mount the accessories on the multiple accessory support bracket.

17. The multiple accessory support bracket of claim 16, wherein the accessories comprise at least one line replaceable unit (LRU).

18. The multiple accessory support bracket of claim 17, wherein the LRU comprises a fuel control unit (FCU).

19. The multiple accessory support bracket of claim 18, wherein the LRU comprises an exciter.

20. The multiple accessory support bracket of claim 18, wherein the LRU comprises a data memory module (DMM).

21. The multiple accessory support bracket of claim 16, wherein the accessories comprise at least one electrical wiring harness.

22. The multiple accessory support bracket of claim 21, wherein at least one of the secondary fasteners pass through an electrical wiring harness clamp and fasten to at least one of the secondary bracket attachment points to mount the electrical wiring harness on the multiple accessory support bracket.

23. The multiple accessory support bracket of claim 16, wherein the accessories comprise at least one fuel tube assembly.

24. The multiple accessory support bracket of claim 23, wherein at least one of the secondary fasteners pass through a fuel tube assembly clamp and fasten to at least one of the secondary bracket attachment points to mount the fuel tube assembly on the multiple accessory support bracket.

25. The multiple accessory support bracket of claim 16, wherein the accessories comprise at least one pneumatic tube assembly.

26. The multiple accessory support bracket of claim 25, wherein at least one of the secondary fasteners pass through a pneumatic tube assembly clamp and fasten to at least one of the secondary bracket attachment points to mount the pneumatic tube assembly on the multiple accessory support bracket.

* * * * *